Sept. 10, 1968  A. H. B. WALKER  3,401,303
CIRCUIT CLOSING AND INTERRUPTING APPARATUS
Filed Nov. 23, 1965
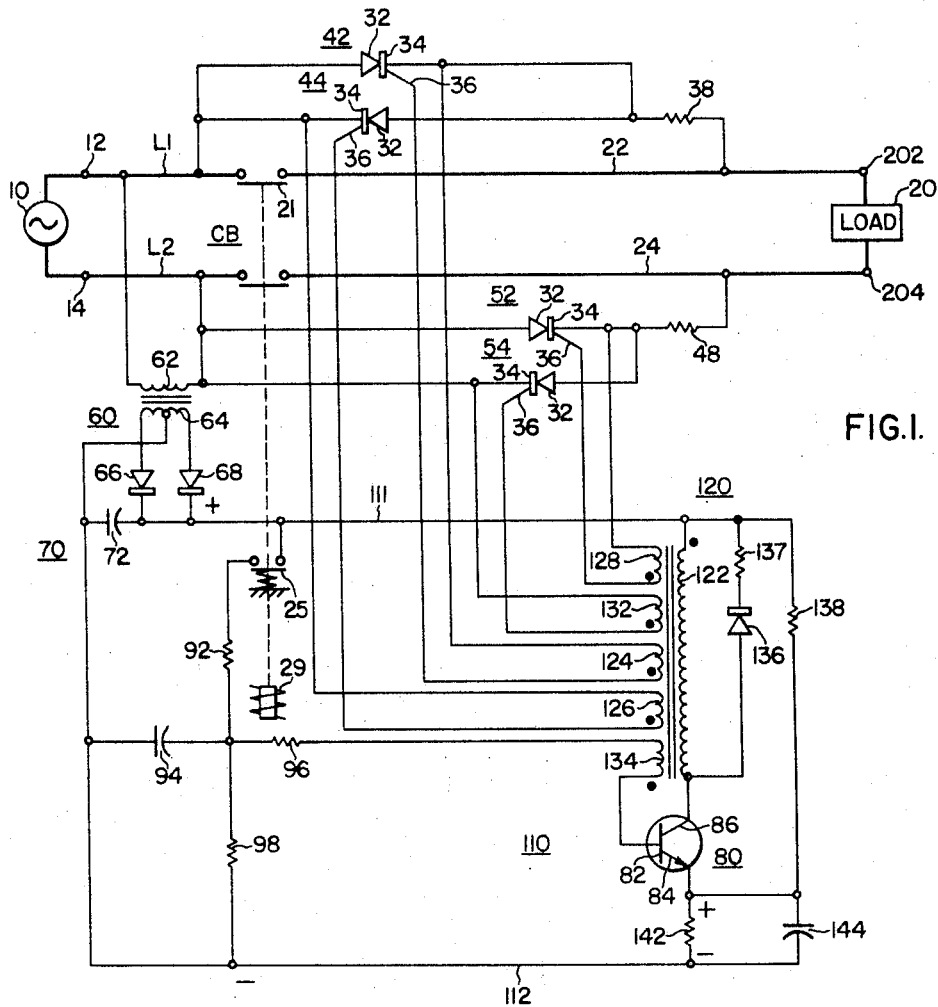
FIG.I.
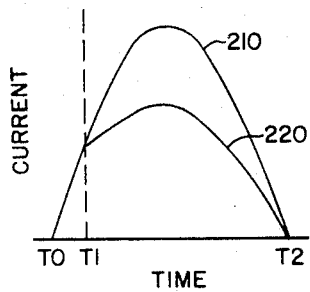
FIG.2.
WITNESSES
INVENTOR
Alec H. B. Walker
BY
ATTORNEY 3,401,303
CIRCUIT CLOSING AND INTERRUPTING
APPARATUS
Alec H. B. Walker, Trafford, Pa., assignor to Westinghouse Electric Corporation, Pittsburgh, Pa., a corporation of Pennsylvania
Filed Nov. 23, 1965, Ser. No. 509,340
7 Claims. (Cl. 317—11)

ABSTRACT OF THE DISCLOSURE

This invention relates to electrical control apparatus and more particularly to circuit closing and interrupting apparatus for initiating and interrupting the flow of current from a source of electric power to a load or load circuit.

More specifically, controlled rectifiers are connected across the separable main contacts of a circuit interrupter which includes an auxiliary contact means actuable with the main contacts to close prior to the main contacts and to open after the main contacts. A pulse generating means is connected to the controlled rectifiers to apply firing pulses to the controlled rectifiers whenever the auxiliary contact means is closed and to stop applying firing pulses when the auxiliary contact means is opened at a repetition rate which is relatively large compared with the frequency of the alternating current being controlled.

---

Various types of static circuit closing and interrupting means or switching means employing semiconductor switching devices, such as silicon controlled rectifiers, have been proposed and employed to interrupt or control the flow of current from a source of electric power to a load. Static circuit interrupters of this type have the advantage over conventional circuit interrupters employing mechanically separable contacts, such as circuit breakers, switches or contactors, that arcing during circuit making and interruption is substantially eliminated. One important limitation in applying static circuit interrupters of the above type is due to the limited current carrying capabilities of available semiconductor switching devices, such as controlled rectifiers, when called upon to initiate heavy current inrush and to carry current continuously to the load during normal operating conditions and to statically interrupt the large fault currents which may result during certain abnormal operating conditions. It is therefore desirable to provide an improved circuit interrupter or control means employing semiconductor switching devices, such as controlled rectifiers, which more efficiently utilizes the current carrying capabilities of such devices to permit the closing of circuits with large inrush currents and the interruption of larger magnitudes of fault currents.

It is an object of this invention to provide a new and improved control apparatus for controlling the flow of electric current from a source of electric power to a load or load circuit.

Another object of this invention is to provide an improved means for initiating and interrupting the flow of current from a source of electric current to a load which substantially eliminates or reduces arcing during circuit closing or interruption.

A further object of this invention is to increase the current which can be initiated or interrupted by a semiconductor switching device, such as a controlled rectifier, of a particular current carrying rating.

A still further object of this invention is to provide an improved method of interrupting current flow from a source of electric power or current to a load.

A final object of this invention is to provide an improved means for controlling the flow of current from a source to a load including means for limiting the fault current which might otherwise flow during certain heavy fault conditions.

Other objects of the invention will, in part, be obvious and will, in part, appear hereinafter.

For a fuller understanding of the nature and objects of the invention, reference should be had to the following detailed description, taken in conjunction with the accompanying drawing, in which:

FIGURE 1 is a schematic diagram of circuits and apparatus illustrating a preferred embodiment of this invention; and FIG. 2 is a current waveform illustrating the operation of the electrical control apparatus shown in FIGURE 1.

Referring now to the drawing and FIGURE 1 in particular, there is illustrated an electrical control apparatus, more specifically, a circuit making and breaking or switching system which is adapted to control the flow of current from a source of alternating current voltage, as indicated at 10, through the input terminals 12 and 14 to a load or load circuit, as indicated at 20, through the corresponding load terminals 202 and 204 respectively. In general, the control system shown in FIGURE 1 comprises a circuit interrupter CB, which may be an automatically operable circuit breaker or a manually operable switch, having first and second pairs of separable contacts, as indicated at 21 and 23, respectively, which are connected in series between corresponding terminals of the source 10 and the load 20 with first and second pairs of oppositely poled or reversely connected semiconductor switching devices, such as silicon controlled rectifiers, connected across or in parallel with the respective main contacts of the circuit interrupter or switch CB. The conductivity of the first pair of controlled rectifiers 42 and 44 and the conductivity of the second pair of controlled rectifiers 52 and 54 are controlled by a pulse generating circuit 110.

More specifically, the first pair of separable main contacts 21 of the circuit interrupter CB is connected in series between the source terminal 12 and the load terminal 202 by the line conductors L1 and 22, respectively, while the second pair of main separable contacts of the circuit interrupter CB, as indicated at 23, is connected in series between the source terminal 14 and the load terminal 204 by the line conductors L2 and 24, respectively. In order to coordinate the operation of the controlled rectifiers 42, 44, 52 and 54 with the operation of the circuit interrupter CB, as will be explained hereinafter, the circuit interrupter CB also includes an auxiliary or additional contact, as indicated at 25, which is actuable with the main contacts 21 and 23 by suitable means, such as an operating solenoid, as indicated at 29, to close prior to the main contacts 21 and 23 and to open slightly after the main contacts 21 and 23, as will be explained in detail hereinafter.

Each of the silicon controlled rectifiers 42, 44, 52 and 54 includes an anode 32, a cathode 34 and a gate electrode or element 36. As is well known in the art, each of the controlled rectifiers 42, 44, 52 and 54 may be utilized or operated in a switching mode and will block current flow in either direction through the anode-cathode path until a critical breakover voltage is exceeded or until a gating voltage or signal which is positive with respect to the cathode 24 is applied to the associated gate electrode 36 of the particular controlled rectifier. When an appropriate gating pulse is applied to the gate electrode of each of the controlled rectifiers 42, 44, 52 and 54, the breakover voltage is reduced to a very low value of voltage and after the breakover voltage applied to the controlled rectifier is exceeded, the controlled rectifier will be rendered highly or substantially fully conductive and will sustain a very high current flow with very little voltage across the controlled rectifier, assuming that the voltage at the anode is positive with respect to the voltage at the cathode of the controlled rectifier. After a particular controlled rectifier has been rendered highly conductive or turned "on" by the application of the gate pulse and the polarity of the alternating current voltage applied to the controlled rectifier is reversed, the controlled rectifier will revert to substantially a non-conductive condition as long as the voltage applied to the cathode remains positive with respect to the voltage at the associated anode and control will be restored to the gate electrode of the controlled rectifier to permit the application of a gating pulse to turn the controlled rectifier "on" when the voltage at the anode again becomes positive with respect to the cathode. In other words, once a controlled rectifier is rendered highly conductive by the application of a gating pulse when the voltage at the anode is positive with respect to the cathode, the controlled rectifier will remain in a highly conductive state similar to a closed switch until the alternating current voltage applied to the controlled rectifier reverses at the end of the half-cycle in which the gating pulse is applied.

In order to permit current flow in both directions between the source terminals 12 and 14 and the corresponding load terminals 202 and 204, respectively, the first pair of controlled rectifiers 42 and 44 is connected between the source terminal 12 and the load terminal 202 and the second pair of controlled rectifiers 52 and 54 is connected between the source terminal 14 and the load terminal 204 to provide an alternate shunt current path around the associated main contacts 21 and 23, respectively, of the circuit interrupter CB. In order to limit current flow through the controlled rectifiers 42, 44, 52 and 54, the current limiting impedances or resistances 38 and 48 are connected in series with the respective pairs of controlled rectifiers with one series circuit being connected between the source terminal 12 and the load terminal 202 and the other series circuit being connected between the source terminal 14 and the load terminal 204. The impedances or resistances 38 and 48 serve to limit the current flow through the controlled rectifiers 42, 44, 52 and 54 during opening and closing of the controlled circuit, particularly during heavy fault or short circuit conditions.

In order to reduce or to substantially eliminate arcing during the opening and closing of the main separable contacts 21 and 23 of the circuit interrupter CB, the pulse generating means 110 is connected in circuit relation with the controlled rectifiers 42, 44, 52 and 54 to render each of said controlled rectifiers substantially fully conductive prior to the closing of the separable contacts 21 and 23 of the circuit interrupter CB, to maintain all of the controlled rectifiers fully conductive while the separable contacts 21 and 23 remain closed and to maintain the rectifiers substantially fully conductive for a period of time slightly after the opening of the separable contacts 21 and 23 of the circuit interrupter CB. In general, the pulse generating circuit or blocking oscillator 110 is actuated by the auxiliary contact 25 of the circuit interrupter CB to apply gating or firing pulses to render the controlled rectifiers 42, 44, 52 and 54 substantially fully conductive prior to the closing of the main separable contacts 21 and 23 of the circuit interrupter CB to maintain the controlled rectifiers substantially fully conductive while the latter contacts remain closed and to maintain the controlled rectifiers substantially fully conductive for a period of time slightly after the contacts 21 and 23 are actuated to the open position, as will be explained in detail hereinafter.

In order to provide a power supply for the pulse generating circuit 110, a full wave rectifier circuit 70 is provided which comprises a transformer 60 having a primary winding 62 connected to the source 10 across the line conductors L1 and L2 and a secondary winding 64. The secondary winding 64 of the transformer 60 includes a center tap connection which is electrically connected to the negative terminal 112 of the full wave rectifier circuit 70 and the opposite ends of the secondary winding 64 are connected to the positive terminal 111 of the rectifier circuit 70 through the diodes 66 and 68 with the filter capacitor 72 being connected between the positive terminal 111 and the negative terminal 112 of the rectifier circuit 70 just described.

The pulse generating circuit 110 includes an NPN transistor 80 having an emitter 84 which is connected to the negative terminal 112 of the rectifier circuit 70 through the resistor 142 and the capacitor 144 which are connected in parallel with one another. The emitter 84 of the transistor 80 is also connected to the positive terminal 111 of the rectifier circuit 70 through the resistor 138 which, together with the resistor 142, forms a voltage dividing network between the positive terminal 111 and the negative terminal 112 of the rectifier circuit 70 to determine during certain operating conditions the voltage level at the emitter 84 of the transistor 80. The collector 86 of the transistor 80 is connected to the positive terminal 111 of the rectifier circuit 70 through the primary winding 122 of the output coupling transformer 120. The base 82 of the transistor 80 is connected through a positive feedback winding 134 of the transformer 120 and the resistor 96 of the junction between the resistors 92 and 98 which are connected in series with one another and with the auxiliary contact 25 of the circuit interrupter CB between the negative terminal 112 and the positive terminal 111 of the rectifier circuit 70. A ramp charging capacitor 94 is connected between the negative terminal 112 of the rectifier circuit 70 and the junction point between the resistors 92 and 98, for reasons which will be explained hereinafter. The output windings 124 and 126 of the transformer 150 are connected between the gate electrodes and the cathodes of the controlled rectifiers 42 and 44, respectively, while the output windings 128 and 132 of the transformer 150 are connected between the gate electrodes and the cathodes of the controlled rectifiers 52 and 54, respectively, to apply gating pulses or signals to the respective controlled rectifiers when the transistor 80 conducts that are positive at the gate electrodes of the respective controlled rectifiers with respect to the associated cathode electrodes to render all of the controlled rectifiers 42, 44, 52 and 54 highly conductive simultaneously. The diode 136 is connected in series with the resistor 137 across or in parallel with the primary winding 122 of the output transformer 120 in order to maintain the voltage at the collector 86 of the transistor 80 at a value which is close to the voltage at the positive terminal 111 of the rectifier circuit 70 during certain operating periods when the transistor 80 is substantially non-conducting or cut off and to assist in dissipating energy stored in the primary winding during certain operating periods of the pulse generating circuit 110.

In the operation of the pulse generating circuit 110, it is assumed that initially the auxiliary contact 25 is open and that the capacitor 94 is substantially discharged. At this time, the emitter 84 of the transistor 80 is at a voltage level which is positive with respect to the negative terminal 112 of the rectifier circuit 70 by the amount of the voltage drop across the resistor 142 and the capacitor 144 is charged to a voltage level equal to the voltage drop across the resistor 142, which is determined by the relative magnitudes of the resistors 138 and 142 which are connected between the positive terminal 111 and the negative terminal 112 of the rectifier circuit 70. Since at this time the emitter of the transistor 80 is positive with respect to the base 82, the NPN transistor 80 is substantially non-conducting or cut off and substantially no current is flowing through the primary winding 122 of the coupling transformer 120. When the main separable contacts 21 and 23 of the circuit interrupter CB are actuated to a closed circuit position by the operating solenoid 29, the auxiliary contact 25 will close prior to the main separable contacts 21 and 23 to thereby close a circuit which extends from the positive terminal 111 of the rectifier circuit 70 through the resistor 92 to the junction between the capacitor 94 and the resistor 96. The capacitor 94 will then begin to charge through the resistor 92 with the voltage at the right end of the capacitor 94 increasing to a positive value with respect to the negative terminal 112 of the rectifier circuit 70 until the voltage at the base 82 of the transistor 80 exceeds the voltage drop across the resistor 142 by an amount equal to the forward voltage drop in the base emitter circuit of the transistor 80. The transistor 80 will then start to conduct and current will flow from the positive terminal 111 of the rectifier circuit 70 through the primary winding 122 of the transformer 120 and through the collector-emitter circuit of the transistor 80 to the negative terminal 112 of the rectifier circuit 70 through the resistor 142. When current starts to flow in the primary winding 122 of the transformer 120, a positive feedback voltage will be induced in the winding 134 of such a polarity as to add to the positive voltage at the base 82 of the transistor 80 which will then rapidly reach a fully conducting condition. While the transistor 80 is conducting, the capacitor 144 will charge to a higher voltage than the voltage across the capacitor prior to conduction of the transistor 80 until the voltage at the emitter 84 of the transistor 80 is slightly positive with respect to the voltage at the base 82 of the transistor 80. The current through the transistor 80 will then start to decrease and the feedback voltage in the winding 134 will reverse in polarity so as to accelerate the decreasing of the current through the transistor 80 and through the primary winding 122 of the transformer 120 rapidly until the transistor 80 is returned to a substantially non-conducting or cutoff condition. During the period that the transistor 80 is conducting, the capacitor 94 will discharge to a lower voltage level which depends upon the relative values of the capacitors 94 and 144 and assuming that the auxiliary contact 25 remains closed, the capacitor 94 will again start to charge to a higher voltage level in a repetitive cycle of operations in which the transistor 80 alternately conducts pulses of currents and is alternately cut off during current blocking periods. As long as the auxiliary contact 25 remains closed, the pulse generating circuit or blocking oscillator 110 will be "free running" and will generate a train of gating or firing pulses at a repetition rate which is preferably relatively large compared with the frequency of the alternating current from the source 10 to insure that the controlled rectifiers 42, 44, 52 and 54 will be promptly rendered conductive whenever the main separable contacts 21 and 23 are actuated to a closed circuit condition and to insure that the above controlled rectifiers will be promptly rendered substantially fully conductive at the beginning of each half-cycle during which the respective controlled rectifiers are called upon to conduct current between the source 10 and the load 20.

In the overall operation of the circuit interrupting system shown in FIG. 1, it is assumed that initially the main separable contacts 21 and 23 of the circuit interrupter CB are in the open circuit positions and that the auxiliary contact 25 is also in an open circuit position. When the auxiliary contact 25 is in the open circuit position, the pulse generating circuit 110 will maintain the controlled rectifiers 42, 44, 52 and 54 in a blocking or substantially non-conducting condition, since the transistor 80 will be in a corresponding cut off or substantially non-conducting condition. When the main separable contacts 21 and 23 of the circuit interrupter CB are actuated to a closed circuit condition, the auxiliary contact 25 will close prior to the closing of the main separable contacts 21 and 23 and gating or firing pulses will be applied to the controlled rectifiers 42, 44, 52 and 54 before the separable contacts 21 and 23 reach a closed circuit position in order to establish an initial current carrying path between the source 10 and the load 20 through the upper and lower pairs of controlled rectifiers 42 and 44 and 52 and 54, respectively. As soon as the main separable contacts 21 and 23 reach a closed circuit position, the current between the source 10 and the load 20 will be substantially entirely transferred to the contacts 21 and 23 and current flow through each of the controlled rectifiers will be reduced to substantially a negligible value. In other words, the initial current carrying path which is established through the pairs of controlled rectifiers 42 and 44, 52 and 54 will be substantially bypassed as soon as the main separable contacts 21 and 23 of the circuit interrupter CB close. It is to be noted that the effective impedance or resistance through the separable contacts 21 and 23 of the circuit interrupter will normally be much lower than the effective impedance of the pairs of controlled rectifiers 42 and 44, and 52 and 54 and the associated impedances 38 and 48, respectively.

During an interrupting operation of the system shown in FIG. 1, the separable main contacts 21 and 23 of the circuit interrupter are first actuated to an open position by suitable means, such as the operating solenoid 29, with the auxiliary contact 25 arranged to open slightly after the main separable contacts 21 and 23 to insure that the current which is flowing from the source 10 to the load 20 prior to the opening of the main contacts 21 and 23 will transfer to the pairs of controlled rectifiers 42 and 44 and 52 and 54 in a substantially arcless manner when the contacts 23 and 21 are actuated to the open position. The time delay in opening the auxiliary contact 25 should be sufficient to permit transfer of the current from the contacts 21 and 23 to the associated pairs of controlled rectifiers before the contacts 21 and 23 are actuated to their fully open positions. After the current is transferred to the controlled rectifiers in the manner just described, the auxiliary contact 25 then opens to remove all firing or gating pulses from the controlled rectifiers 42, 44, 52 and 54 to render said controlled rectifiers substantially non-conductive at the end of the half-cycle of alternating current from the source 10 in which the auxiliary contact 25 opens.

Referring now to FIG. 2, there is illustrated a current waveform of a half-cycle of current flowing from the source 10 of the load 20 which may result during a fault condition. The current waveform 210 indicates the current which might result in the absence of the controlled rectifiers which are provided in a control system as disclosed. When the main separable contacts 21 and 23 of the circuit interrupter CB, open, to transfer the current to the controlled rectifiers 42, 44, 52 and 54, the effected impedance introduced into the circuit between the source 10 and the load 20 will substantially reduce the fault current that might otherwise flow from the current waveform, indicated at 210, to the waveform, as indicated at 220. If the current half-cycle begins at time $T_0$ and the auxiliary contact 25 is opened at the time indicated at $T_1$, the current will continue to flow through one of the controlled rectifiers 42 or 44 and through one of the controlled rectifiers 52 or 54 until the end of the half-cycle during which the auxiliary contact 25 is opened, as indicated by the time $T_2$ in FIG. 2. Since the gating or firing pulses will be immediately discontinued by the opening of the auxiliary contact 25, all of the controlled rectifiers 42, 44, 52 and 54 will be rendered substantially non-conducting or cut off at the end of the half-cycle of alternating current from the source 10 during which the auxiliary contact 25 is open. Since the final current interruption occurs statically in the parallel current paths which include the controlled rectifiers 42, 44, 52 and 54, the overall circuit interruption will be accomplished in a manner which either substantially reduces or eliminates arcing at the contacts 21 and 23 of the circuit interrupter CB depending upon the values of the current limiting impedances 38 and 48 selected. It is to be noted that only one controlled rectifier of each of the pairs of controlled rectifiers 42 and 44 and 52 and 54 is conducting at any time or during any particular half-cycle of the alternating current 10. For example, assuming that gating pulses are being applied to the controlled rectifiers 42, 44, 52 and 54, when the source terminal 12 is positive with respect to the source terminal 14, a conductive path may be traced through the controlled rectifier 42, the current limiting impedance 38, the load 20, the current limiting impedance 48, the controlled rectifier 54 and back to the source terminal 14 through the line conductor L2. On the other hand, assuming that the pulse generating circuit 110 is applying gating or firing pulses to the respective pairs of controlled rectifiers 42 and 44 and 52 and 54, and that the source terminal 14 is positive with respect to the source terminal 12, an alternate current path can be traced from the source terminal 14 through the line conductor L2, the controlled rectifier 52, the current limiting impedance 48, the load 20, the current limiting impedance 38, the controlled rectifier 44, and back to the source terminal 12 through the line conductor L1.

It is important to note that during the overall operation of the circuit interruption system shown in FIG. 1, that after the main separable contacts 21 and 23 of the circuit interrupter CB open and current transfers to the respective pairs of controlled rectifiers, that current interruption occurs automatically at the end of the half-cycle of alternating current during which the auxiliary contact 25 is opened and gating or firing pulses are removed from the various controlled rectifiers.

It is to be understood that the teachings of this invention may be applied to polyphase or three-phase circuits in addition to the single phase circuit, as illustrated and described. In a polyphase application of the invention, it is to be understood that a pair of oppositely poled controlled rectifiers may be connected across the separable contacts of an associated circuit interrupter as disclosed between the corresponding terminals of the polyphase source and the polyphase load. It is to be further understood that other combinations of controlled rectifiers and diodes may be substituted for the pairs of oppositely poled controlled rectifiers, as disclosed. For example, a diode may be substituted for one of the controlled rectifiers in each pair of controlled rectifiers in a particular application.

It is also to be understood that the teachings of the applicant's invention may be applied to a control system in which the application and removal of gating pulses to the controlled rectifiers may be accomplished manually rather than automatically, as disclosed in FIG. 1. In other words, the teachings of the applicant's invention may be applied in a method of controlling the flow of current from the source of alternating or direct current to a load through the contacts of a circuit interrupter which is provided with a plurality of controlled rectifiers connected across the contacts. Such a method would comprise the steps of applying repetitive gating or firing pulses to the controlled rectifiers 42, 44, 52 and 54 prior to the closing of the main separable contacts 21 and 23 of the circuit interrupter CB by manually closing a switch similar to the automatic auxiliary contact 25 but actuable independently of the circuit interrupter CB to initiate substantially full current flow to the load, next closing the main separable contacts 21 and 23 of the circuit interrupter CB to bypass substantially all of the current to the load around the controlled rectifiers 42, 44, 52 and 54 through the associated contacts 21 and 23, next opening the contacts 21 and 23 of the circuit interrupter to transfer current from the contacts 21 and 23 to the controlled rectifiers 42, 44, 52 and 54, and finally removing any firing pulses from the controlled rectifiers 42, 44, 52 and 54 by manually opening a switch which would be actuable independently of the circuit interrupter CB and which would be connected similarly to the auxiliary contact 25 to render the controlled rectifier substantially non-conductive at the end of the half-cycle during which the firing or gating pulses are removed from the controlled rectifiers 42, 44, 52 and 54.

The circuits and apparatus embodying the teachings of this invention have several advantages. For example, the controlled rectifiers in a control system as disclosed carry substantially no current ro negligible current during normal operation when the contacts of the associated circuit interrupter are closed and are only required to carry the load or fault current during a portion of a half-cycle of the alternating current which is being controlled. Since the controlled rectifiers are called upon to carry the load or fault current during interruption for such a short time, the controlled rectifiers can be rated on a surge basis and very large currents can be handled or interrupted by relatively modest ratings of controlled rectifiers. For example, it has been found that a particular controlled rectifier which is commercially available and which is normally rated to carry a continuous current of only 50 amperes will carry approximately 1,000 amperes peak current for one-half cycle of alternating current at a frequency of 60 cycles per second. In addition, in a controlled system as disclosed, it is important to note that the fault current or abnormal current that might otherwise increase to a larger value is limited by the insertion of the effective impedance of the controlled rectifiers and, where required, the associated current limiting impedances to thereby reduce or substantially eliminate arcing as well as severe magnetic forces or voltage transients that might otherwise damage equipment in the load circuit. Finally, circuit interruption in the control system as disclosed is accomplished automatically at the end of the half-cycle during which the auxiliary contact of the circuit interrupter is opened and the gating pulses are removed from the controlled rectifiers in a control system as disclosed to take greater advantage of the operating characteristics of semiconductor switching devices, such as silicon controlled rectifiers.

Since numerous changes may be made in the above-described apparatus and circuits, and different embodiments of the invention may be made, without departing from the spirit and scope thereof, it is intended that all the matter contained in the foregoing description or shown in the accompanying drawings shall be interpreted as illustrative and not in a limiting sense.

I claim as my invention:

1. An electrical control apparatus for controlling the flow of current from a source of electric power to a load comprising a circuit interrupter having separable main contacts adapted to be connected in series with the load and an additional contact means actuable with the main contacts to close prior to the main contacts and to open slightly after the main contacts open, at least one controlled rectifier connected across the main contacts, means connected in circuit relation between the source and the controlled rectifier and controlled by the additional contact to render the controlled rectifier substantially fully conductive when the additional contact is closed prior to the closing of the main contacts and to render the controlled rectifier substantially non-conductive when the additional contact is opened slightly after the main contacts are opened, said controlled rectifier being maintained substantially fully conductive by said last-mentioned means whenever said main contacts are closed.

2. The combination as claimed in claim 1 wherein a resistance is connected in series with the controlled rectifier to limit the current which flows from the source to the load during the opening and closing of the associated circuit interrupter.

3. An electrical control apparatus for controlling the flow of current from a source of alternating current to a load comprising a circuit interrupter having separable main contacts actuable between open and closed positions and connected in series with the load and an auxiliary contact actuable with the main contacts to close prior to the main contacts and to open slightly after the main contacts, a pair of reversely connected, silicon controlled rectifiers connected in series with a current limiting impedance, the last-mentioned series circuit being connected across the main contacts of the circuit interrupter to control current flow from the source to the load when the main contacts are open, and means connected in circuit relation with the auxiliary contact and the controlled rectifiers to render the controlled rectifiers substantially fully conductive when the auxiliary contact is closed prior to the main contacts and to render the controlled rectifiers substantially non-conductive when the main contacts are opened and the auxiliary contact is subsequently opened, said silicon controlled rectifiers being maintained substantially fully conductive by said last-mentioned means whenever said main contacts are closed.

4. A control system for controlling the flow of current from a source of alternating current having two or more terminals to a load having corresponding terminals comprising a pair of reversely connected controlled rectifiers connected between each terminal of the source and each corresponding terminal of the load, a circuit interrupter having a pair of separable main contacts connected in parallel with each pair of controlled rectifiers and auxiliary contact means actuable with the main contacts to close prior to the main contacts and to open slightly after the main contacts, and a pulse generating means connected in circuit relation with the controlled rectifiers and the auxiliary contact to apply firing pulses to the controlled rectifiers to render the controlled rectifiers substantially fully conductive when the auxiliary contact means closes prior to the main contacts and to stop applying firing pulses to the controlled rectifiers when the auxiliary contact opens slightly after the main contacts open to render the controlled rectifiers substantially non-conductive at the end of the half-cycle of the alternating current from the source during which the auxiliary contact means opens, said controlled rectifiers being maintained substantially fully conductive by said pulse generating means while said main contacts are closed.

5. The combination as claimed in claim 4 wherein a current limiting resistance is connected in series with each pair of controlled rectifiers between each terminal of the source and the corresponding terminal of the load.

6. An electrical control apparatus for controlling the flow of current from a source of alternating current to a load comprising a circuit interrupter having main contacts actuable between open and closed positions and connected in series with the load and an auxiliary contact actuable with the main contacts to close prior to the main contacts and to open slightly after the main contacts, a pair of reversely connected, silicon controlled rectifiers connected in series with a current limiting impedance, the last-mentioned series circuit being connected across the main contacts of the circuit interrupter to control current flow from the source to the load when the main contacts are open, and means connected in circuit relation with the auxiliary contact and the controlled rectifiers to render the controlled rectifiers substantially fully conductive when the auxiliary contact is closed prior to the main contacts and to render the controlled rectifiers substantially non-conductive when the main contacts are opened and the auxiliary contact is subsequently opened, the last-mentioned means comprising a free-running oscillator which applies output firing pulses to the controlled rectifiers whenever the auxiliary contact is closed at a repetition rate which is relatively large compared with the frequency of the alternating current from the source.

7. A control system for controlling the flow of current from a source of alternating current having two or more terminals to a load having corresponding terminals comprising a pair of reversely connected controlled rectifiers connected between each terminal of the source and each corresponding terminal of the load, a circuit interrupter having a pair of separable main contacts connected in parallel with each pair of controlled rectifiers and auxiliary contact means actuable with the main contacts to close prior to the main contacts and to open slightly after the main contacts, and a pulse generating means connected in circuit relation with the controlled rectifiers and the auxiliary contact to apply firing pulses to the controlled rectifiers to render the controlled rectifiers substantially fully conductive when the auxiliary contact means closes prior to the main contacts and to stop applying firing pulses to the controlled rectifiers when the auxiliary contact opens slightly after the main contacts open to render the controlled rectifiers substantially non-conductive at the end of the half-cycle of the alternating current from the source during which the auxiliary contact means opens, the pulse generating means comprising a free-running oscillator having an input connected in circuit relation with the source and an output connected in circuit relation with the controlled rectifiers to apply firing pulses to the controlled rectifiers whenever the auxiliary contact is closed at a repetition rate which is relatively large compared with the frequency of the alternating current from the source.

References Cited
UNITED STATES PATENTS

| | | | |
|---|---|---|---|
| 2,789,253 | 4/1957 | Vang | 317—11 |
| 3,237,030 | 2/1966 | Coburn | 317—11 X |

LEE T. HIX, *Primary Examiner.*

J. D. TRAMMELL, *Assistant Examiner.*